United States Patent
Zhou et al.

(10) Patent No.: US 11,572,317 B2
(45) Date of Patent: Feb. 7, 2023

(54) DENSE LEAD METANIOBATE PIEZOELECTRIC CERAMIC MATERIAL AND PREPARATION METHOD THEREOF

(71) Applicant: SHANGHAI INSTITUTE OF CERAMICS, CHINESE ACADEMY OF SCIENCES, Shanghai (CN)

(72) Inventors: Zhiyong Zhou, Shanghai (CN); Yuchen Li, Shanghai (CN); Xianlin Dong, Shanghai (CN)

(73) Assignee: SHANGHAI INSTITUTE OF CERAMICS, CHINESE ACADEMY OF SCIENCES, Shanghai (CN)

(*) Notice: Subject to any disclaimer, the term of this patent is extended or adjusted under 35 U.S.C. 154(b) by 192 days.

(21) Appl. No.: 17/111,784

(22) Filed: Dec. 4, 2020

(65) Prior Publication Data
US 2021/0179497 A1    Jun. 17, 2021

(30) Foreign Application Priority Data
Dec. 11, 2019    (CN) .......................... 201911266838.4

(51) Int. Cl.
C04B 35/497    (2006.01)
C04B 35/626    (2006.01)

(52) U.S. Cl.
CPC ........ *C04B 35/497* (2013.01); *C04B 35/6261* (2013.01); *C04B 35/62655* (2013.01); *C04B 35/62675* (2013.01); *C04B 2235/77* (2013.01)

(58) Field of Classification Search
CPC .......... C04B 35/497; C04B 2235/3255; C01G 31/00
See application file for complete search history.

(56) References Cited

FOREIGN PATENT DOCUMENTS

| | | |
|---|---|---|
| CN | 1092560 A | 9/1994 |
| CN | 1295047 A | 5/2001 |
| CN | 102976753 A | 3/2013 |

*Primary Examiner* — Karl E Group
(74) *Attorney, Agent, or Firm* — Alleman Hall Creasman & Tuttle LLP

(57) ABSTRACT

The present application discloses a dense lead metaniobate piezoelectric ceramic and a preparation method therefor. The chemical composition of the lead metaniobate piezoelectric ceramic is $Pb_{1-x}Nb_2O_6$, wherein x represents the Pb vacancy concentration of A sites in a tungsten bronze crystal structure, and x is greater than 0.00 and smaller than or equal to 0.20.

8 Claims, 3 Drawing Sheets

DENSE LEAD METANIOBATE PIEZOELECTRIC CERAMIC MATERIAL AND PREPARATION METHOD THEREOF

TECHNICAL FIELD

The present application relates to a dense lead metaniobate ($PbNb_2O_6$) piezoelectric ceramic material and its preparation method, which belongs to the preparation field of piezoelectric ceramic materials.

BACKGROUND

Piezoelectric ceramic material is one of the most important functional materials for realizing electromechanical energy conversion and coupling, and has been widely used in electronic information, energy detection, advanced manufacturing, medical instruments, and weapon equipment, etc. Lead metaniobate ($PbNb_2O_6$) piezoelectric ceramic material, the first discovered ferroelectric material with a tungsten bronze crystal structure, is characterized by an extremely low mechanical quality factor ($Q_m$<10), single vibration mode (kt>>kp), high Curie temperature ($T_C$: ~570° C.), and low depolarization at higher temperature, and has extensive and important applications in the fields of high temperature sensors, ultrasonic transducers, nondestructive testing, human ultrasound imaging, and so on.

The $PbNb_2O_6$ piezoelectric ceramic material can only form a ferroelectric phase at a high temperature (~1230° C.), but it presents a metastable state at room temperature. In a high-temperature sintering and cooling processes, an abnormal growth of $PbNb_2O_6$ piezoelectric ceramic grains and rhombohedral-tetragonal phase transformation tend to cause great changes in volume and internal stress, resulting in a low density (relative density is about 80%) of $PbNb_2O_6$ piezoelectric ceramics and sample cracking. Therefore, how to achieve high densification and avoid sintering cracking are the first issues to be concerned with in order to fabricate $PbNb_2O_6$ piezoelectric ceramics with excellent performance.

At present, methods such as quenching, doping, or adding oxides are commonly used to inhibit the abnormal growth of grains and increase the density of $PbNb_2O_6$ ceramics. Although the quenching method can restrain abnormal grain growth, it is not suitable for mass production due to its complexity. By replacing $Pb^{2+}$ with $Ca^{2+}$ and $Ba^{2+}$, and adding rare earth oxides and other doping modification methods, such as $Pb_{(1-x)}Me_xNb_2O_6+Yy$ (Chinese Invention Patent ZL93112369.0,ZL00127914.9), $xPb_{1-m-n}(La_m \cdot Sr_n)Nb_2O_6+y(y_1PbTiO_3+y_2BiScO_3)+pwt\%CeO_2+qwt\%SiO_2+uwt\%Ta_2O_5$ (Chinese Invention Patent ZL201210516363.1), the processing feasibility of the above-mentioned materials were improved, and piezoelectric properties were greatly enhanced, but the Curie temperatures $T_C$ were significantly reduced.

SUMMARY

In order to solve the technical bottlenecks of cracking during the sintering process and low relative density of $PbNb_2O_6$ piezoceramics, while maintaining the advantage of a high Curie temperature $T_C$, the present application provides a method of fabricating dense lead metaniobate piezoelectric ceramics.

The chemical composition of the as-mentioned lead metaniobate piezoelectric ceramic is $Pb_{1-x}Nb_2O_6$, in which x represents the vacancy concentration of A-site Pb in a tungsten bronze crystal structure, and x is greater than 0.00 and less than or equal to 0.20.

In the present application, by introducing a certain proportion of Pb vacancy in composition design, the phase transformation occurring at about 1,230° C. during a high-temperature sintering process of lead metaniobate ceramics can be avoided, and the high volume and internal stress changes caused by abnormal grain growth and phase transformation can be inhibited, thus solving the technical problems of sintering cracks and low density of $PbNb_2O_6$ piezoelectric ceramics.

Preferably, x is greater than or equal to 0.03 and less than or equal to 0.20. More preferably, x is greater than or equal to 0.08 and less than or equal to 0.20. Furthermore preferably, x is greater than or equal to 0.15 and less than or equal to 0.20.

Preferably, the lead metaniobate piezoelectric ceramic has a relative density of 93% to 99%, a shrinkage of 15% to 18%, and a Curie temperature $T_C$ of 554 to 560° C.

Preferably, the lead metaniobate piezoelectric ceramic has a Curie temperature $T_C$ of 554 to 560° C. and dielectric loss (tan δ) of 0.55% to 0.63%.

In another aspect, the present application provides a preparation method for the lead metaniobate piezoelectric ceramic, comprising the steps of: weighing raw compounds corresponding to each element according to the stoichiometric ratio of chemical composition of $Pb_{1-x}Nb_2O_6$ and then mixing uniformly to form a mixture; calcining the mixture at 800 to 900° C. for 1 to 3 hours to form a calcined powder; and sintering the calcined powder at 1,260 to 1,300° C. for 2 to 4 hours to obtain the lead metaniobate piezoelectric ceramic.

Preferably, the sintering temperature is 1,260 to 1,280° C.

DETAILED DESCRIPTION

Figure 1:
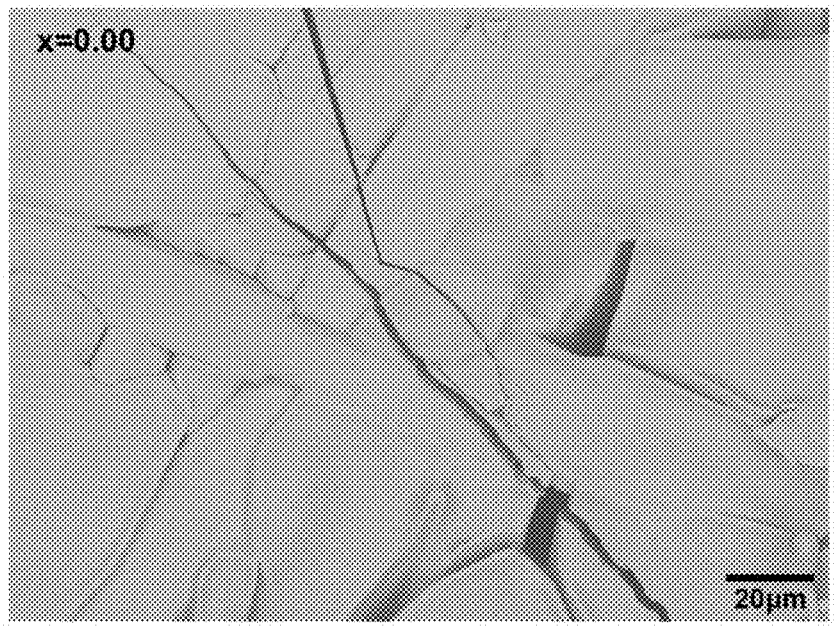
FIG. 1 is a scanning electron microscope image of lead metaniobate ($PbNb_2O_6$) piezoelectric ceramic material (x=0) obtained from comparative example 1.
Figure 2:
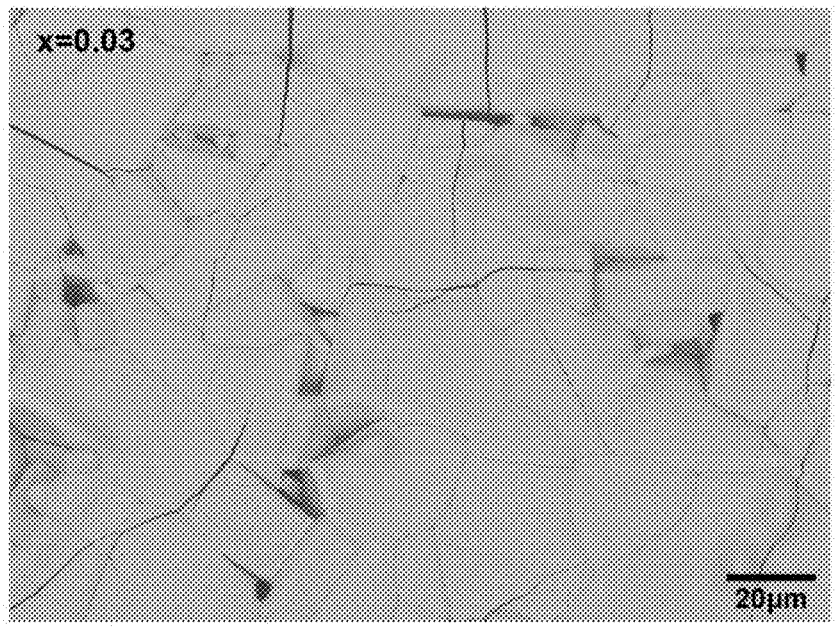
FIG. 2 is a scanning electron microscope image of lead metaniobate ($Pb_{1-x}Nb_2O_6$) piezoelectric ceramic material (x=0.03) obtained from example 1.
Figure 3:
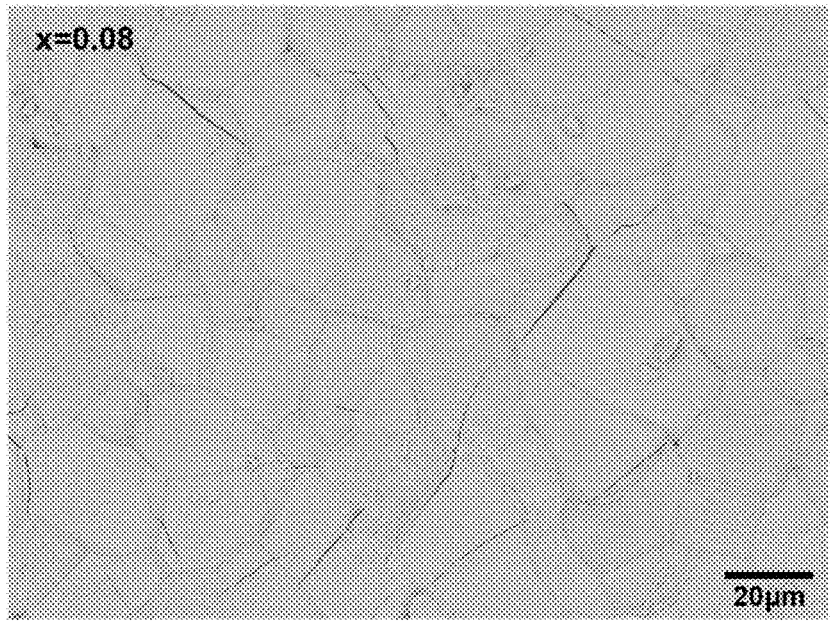
FIG. 3 is a scanning electron microscope image of lead metaniobate ($Pb_{1-x}Nb_2O_6$) piezoelectric ceramic material (x=0.08) obtained from example 3.
Figure 4:
FIG. 4 is a scanning electron microscope image of lead metaniobate ($Pb_{1-x}Nb_2O_6$) piezoelectric ceramic material (x=0.15) obtained from example 5.
Figure 5:
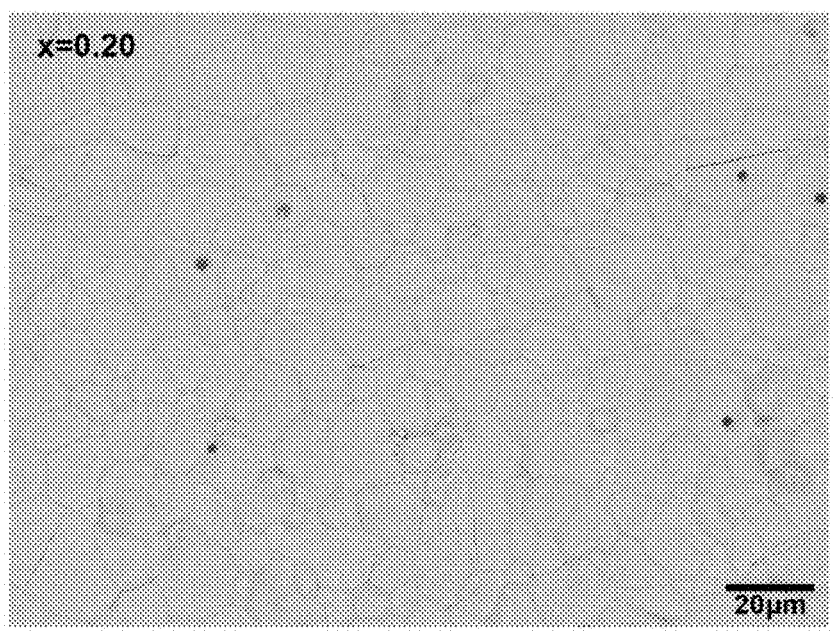
FIG. 5 is a scanning electron microscope image of lead metaniobate ($Pb_{1-x}Nb_2O_6$) piezoelectric ceramic material (x=0.20) obtained from example 7.

The present invention will be further described with the following embodiments below. It should be understood that the following embodiments are only used for explaining this invention, and do not limit this invention.

The present application provides a kind of $PbNb_2O_6$-based piezoelectric ceramic with high Curie temperature and high density. The chemical composition of the lead metaniobate piezoelectric ceramic is $Pb_{1-x}Nb_2O_6$, wherein x is greater than 0 and less than or equal to 0.20, and represents the Pb vacancies concentration of A sites in a tungsten bronze crystal structure. The vacancy design of Pb in this application makes the composition of the material deviate from its stoichiometric ratio, but the main phase remains $PbNb_2O_6$, hence the Curie temperature $T_C$ remains almost unchanged, though a small amount of the secondary phase is generated. The application has the following advantageous effects: on the one hand, it can promote liquid phase sintering at a high temperature, and make the grain size more uniform (especially when x is more than 0.05, liquid phase produced by high-temperature sintering can be seen more clearly at grain boundary from grain morphology images), and correspondingly, the density can also be improved; on the other hand, the phase transformation at 1,230° C. is inhibited, and the surface cracks caused by changes in volume and internal stress due to phase transformation are reduced or gradually eliminated, which promote the increase of density and reduction of cracks, further reducing the dielectric loss of $PbNb_2O_6$ piezoelectric ceramics slightly.

In the chemical composition, x can be greater than or equal to 0.03 and less than or equal to 0.20. In some embodiments, x is greater than or equal to 0.08 and less than or equal to 0.20. More preferably, x is greater than or equal to 0.15 and less than or equal to 0.20. As can be seen from the SEM surface morphology, when the Pb vacancy concentration is greater than or equal to 0.08, the grain size changes significantly, specifically, the grain size decreases significantly and becomes more uniform; when x is greater than or equal to 0.15, these phenomena are more significant, that is, grain size is more uniform, and phase transition at 1,230° C. is completely inhibited, resulting in a further increase of densification and fewer surface cracks. It should be noted that when x is greater than 0.08, i.e., the composition design of the lead metaniobate piezoelectric ceramics deviates far from the stoichiometric ratio of the formula provided by the present application, it is easy to produce a large number of secondary phases or even multiphases. Hence, in that case, the main phase gradually loses its inherent characteristics of $PbNb_2O_6$ piezoelectric ceramics, and has no practical value.

The following is an illustrative description of the preparation method of the lead metaniobate piezoelectric ceramics provided by this application.

Firstly, raw compounds of each element are selected as raw materials according to the chemical general formula of $Pb_{1-x}Nb_2O_6$. In the formula, for example, the raw compound corresponding to Pb is selected from PbO or $Pb_3O_4$; and the raw compound corresponding to Nb is selected from $Nb_2O_5$.

Secondly, the raw materials are weighed and ground into a powder. For example, both raw materials are weighed according to the stoichiometric ratio of the chemical formula of $Pb_{1-x}Nb_2O_6$, and then mixed evenly after adding deionized water, subsequently followed by grinding for 4 to 6 hours through planetary ball milling until the raw materials are well-mixed. In addition, the ratio of the weight of added deionized water to the total weight of raw materials is 125% to 135%.

Then, a solid-phase reaction is conducted to synthesize a calcined powder. The ground powder is subjected to a solid-phase reaction in air. The heating rate is 1 to 3° C./min, the reaction temperature is 800 to 900° C., and the reaction time is 1 to 3 hours.

Subsequently, deionized water is added to the calcined powder, followed by uniform mixing and grinding for 4 to 6 hours. The ratio of the weight of the added deionized water to the weight of the calcined powder is 125% to 135%.

Next, the ground powder is sintered in air, and the sintering method is solid-phase reaction sintering (also referred to as secondary solid-state reaction). The heating rate is 1 to 3° C./min, the reaction temperature is 1,260 to 1,300° C., and the reaction time is 2 to 4 hours.

Preferably, secondary solid-state reaction temperature is 1,260 to 1,280° C., and the reaction time is 2 hours.

In the present application, the Curie temperature $T_C$ of the ceramic was obtained by measuring a dielectric temperature spectrum of a sample to be tested, using a precision impedance analyzer (LCR-HP4284A) connected with a high temperature dielectric temperature spectrum testing system (GJW-1, Institute of Electronic Materials, Xi'an Jiaotong University), in accordance with "Test methods for the properties of piezoelectric ceramics—Test for Curie temperature Tc" (GB3389.3-2001). The test temperature ranged from room temperature to 650° C., the heating rate was 2° C./min, and the test frequency was 1 kHz.

In the present application, the dielectric loss tangent (tan δ) was measured using a LCR digital bridge in accordance with "Test methods for properties of structure ceramic used in electronic components" (GB5594.4-1985). The test frequency was 1 kHz.

In the present application, the density was measured according to the Archimedes principle and calculated by the formula $\rho = m_0 * \rho_{water}/(m_1 - m_2)$. In the formula, $m_0$ is the mass of dried sample in air, $m_1$ and $m_2$ are respectively the mass of sample in air and water after fully absorbing water, and $\rho_{water}$ corresponds to the density of distilled water under the test environment. The calculation formula of relative volume density is: $D = \rho/\rho_0 * 100\%$, where $\rho$ and $\rho_0$ represent the bulk density and theoretical density of the sample, respectively. The sample was heated in water bath at 150° C. for 4 hours, and $m_1$ and $m_2$ were measured by an electronic balance. Then the sample was dried at 120° C. and $m_0$ was measured. Finally, the density was calculated.

Compared with other composition designs adopting different doping or adding oxides, the present application adopts an easier composition design of directly introducing Pb vacancy on the basis of the stoichiometric ratio and the principle of phase equilibrium, which can inhibit the abnormal grain growth and rhombohedral-tetragonal phase transformation at high temperature, significantly increase the relative density from 92% to 98%, significantly increase the sintering shrinkage ratio, and basically eliminate the surface cracks of ceramics, all while the Curie temperature and dielectric loss remain basically unchanged. Based on the above beneficial effects, the piezoelectric properties (such as a piezoelectric coefficient, electromechanical coupling coefficient, and mechanical quality factor) can be adjusted by doping appropriate ions in order to satisfy the requirements of different applications like sensors and transducers.

Experimental methods used in the following examples are conventional methods unless otherwise specified.

Materials and reagents used in the following examples can be obtained commercially unless otherwise specified.

TABLE 1

Comparison of sintering temperature and basic properties of $Pb_{1-x}Nb_2O_6$ with different compositions

| Number | x | Sintering Temperature (° C.) | Theoretical Density (g/cm$^3$) | Volume Density (g/cm$^3$) | Relative Density (%) | Shrinkage Ratio (%) | Curie Temperature $T_C$ (° C.) | Dielectric Loss Tan δ (%) |
|---|---|---|---|---|---|---|---|---|
| Comparative Example 1 | 0 | 1260 | 6.621 | 6.102 | 92.2 | 14.68 | 557 | 0.66 |
| Example 1 | 0.03 | 1260 | 6.541 | 6.087 | 93.1 | 16.32 | 557 | 0.60 |
| Example 2 | 0.05 | 1270 | 6.481 | 6.055 | 93.4 | 16.56 | 556 | 0.63 |
| Example 3 | 0.08 | 1270 | 6.390 | 6.026 | 94.3 | 17.29 | 555 | 0.61 |
| Example 4 | 0.10 | 1270 | 6.329 | 6.019 | 95.1 | 16.89 | 554 | 0.59 |
| Example 5 | 0.15 | 1280 | 6.178 | 6.013 | 97.3 | 16.50 | 558 | 0.55 |
| Example 6 | 0.18 | 1280 | 6.087 | 5.934 | 97.5 | 15.83 | 559 | 0.60 |
| Example 7 | 0.20 | 1280 | 6.027 | 5.914 | 98.1 | 15.86 | 559 | 0.59 |

Comparative Example 1

The preparation method of a lead metaniobate piezoelectric ceramic comprises the following steps:

Step (1): weighing 46.565 g of PbO and 54.000 g of $Nb_2O_5$ and placing the materials in a ball mill tank, and then adding 136 g of deionized water; adjusting the rotation speed of the ball mill to be 360 RPM (revolutions per minute), and continuous ball-milling for 4 hours to give an evenly mixed mixture;

Step (2): drying the mixture at 120° C. until it forms a gully shape and calcining the mixture at 850° C. for 2 hours in a low-temperature electric furnace; after grinding the calcined product to powder, passing the powder through a 40-mesh sieve to obtain calcined powder;

Step (3): sintering the prepared calcined powder at 1,260° C. for 2 hours in a high temperature furnace; and Step (4): after coating the surface of the sample prepared in step (3) with silver paste, testing properties of the sample such as Curie temperature and dielectric loss.

Example 1

The preparation method of a lead metaniobate piezoelectric ceramic comprises the following steps:

Step (1): weighing 46.004 g of PbO and 55.000 g of $Nb_2O_5$ and placing the materials in a ball mill tank, and then adding 136 g of deionized water; adjusting the rotation speed of the ball mill to be 360 RPM, and continuous ball-milling for 4 hours to give an evenly mixed mixture;

Step (2): drying the mixture at 120° C. until it forms a gully shape and calcining the mixture at 850° C. for 2 hours in a low-temperature electric furnace; after grinding the calcined product to powder, passing the powder through a 40-mesh sieve to obtain calcined powder;

Step (3): sintering the prepared calcined powder at 1,260° C. for 2 hours in a high temperature furnace; and Step (4): after coating the surface of the sample prepared in step (3) with silver paste, testing properties of the sample such as Curie temperature and dielectric loss.

Example 2

The preparation method of a lead metaniobate piezoelectric ceramic comprises the following steps:

Step (1): weighing 45.056 g of PbO and 55.000 g of $Nb_2O_5$ and placing the materials in a ball mill tank, and then adding 135 g of deionized water; adjusting the rotation speed of the ball mill to be 360 RPM, and continuous ball-milling for 4 hours to give an evenly mixed mixture;

Step (2): drying the mixture at 120° C. until it forms a gully shape and calcining the mixture at 850° C. for 2 hours in a low-temperature electric furnace; after grinding the calcined product to powder, passing the powder through a 40-mesh sieve to obtain calcined powder;

Step (3): sintering the calcined powder at 1,270° C. for 2 hours in a high temperature electric furnace; and Step (4): after coating the surface of the sample prepared in step (3) with silver paste, testing properties of the sample such as Curie temperature and dielectric loss.

Example 3

The preparation method of a lead metaniobate piezoelectric ceramic comprises the following steps:

Step (1): weighing 44.426 g of PbO and 56.000 g of $Nb_2O_5$ and placing the materials in a ball mill tank, and then adding 136 g of deionized water; adjusting the rotation speed of the ball mill to be 360 RPM, and continuous ball-milling for 4 hours to give an evenly mixed mixture;

Step (2): drying the mixture at 120° C. until it forms a gully shape and calcining the mixture at 850° C. for 2 hours in a low-temperature electric furnace; after grinding the calcined product to powder, passing the powder through a 40-mesh sieve to obtain calcined powder;

Step (3): sintering the calcined powder at 1,270° C. for 2 hours in a high temperature electric furnace; and Step (4): after coating the surface of the sample prepared in step (3) with silver paste, testing properties of the sample such as Curie temperature and dielectric loss.

Example 4

The preparation method of lead metaniobate piezoelectric ceramics comprises the following steps:

Step (1): weighing 44.236 g of PbO and 57.000 g of $Nb_2O_5$ and placing the materials in a ball mill tank and then adding 137 g of deionized water; adjusting the rotation speed of the ball mill to be 360 RPM, and continuous ball-milling for 4 hours to give an evenly mixed mixture;

Step (2): drying the mixture at 120° C. until it forms a gully shape and calcining the mixture at 850° C. for 2 hours in a low-temperature electric furnace; after grinding the calcined product to powder, passing the powder through a 40-mesh sieve to obtain calcined powder;

Step (3): sintering the calcined powder at 1,270° C. for 2 hours in a high temperature electric furnace; and Step (4): after coating the surface of the sample prepared in step (3) with silver paste, testing properties of the sample such as Curie temperature and dielectric loss.

Example 5

The preparation method of lead metaniobate piezoelectric ceramics comprises the following steps:

Step (1): weighing 42.512 g of PbO and 58.000 g of $Nb_2O_5$ and placing the materials in a ball mill tank, and then adding 136 g of deionized water; adjusting the rotation speed of the ball mill to be 360 RPM, and continuous ball-milling for 4 hours to give an evenly mixed mixture;

Step (2): drying the mixture at 120° C. until it forms a gully shape and calcining the mixture at 850° C. for 2 hours in a low-temperature electric furnace; after grinding the calcined product to powder, passing the powder through a 40-mesh sieve to obtain calcined powder;

Step (3): sintering the calcined powder at 1,280° C. for 2 hours in a high temperature electric furnace; and Step (4): after coating the surface of the sample prepared in step (3) with silver paste, testing properties of the sample such as Curie temperature and dielectric loss.

Example 6

The preparation method of lead metaniobate piezoelectric ceramics comprises the following steps:

Step (1): weighing 41.719 g of PbO and 59.000 g of $Nb_2O_5$ and placing the materials in a ball mill tank, and then adding 136 g of deionized water; adjusting the rotation speed of the ball mill to be 360 RPM, and continuous ball-milling for 4 hours to give an evenly mixed mixture;

Step (2): drying the mixture at 120° C. until it forms a gully shape and calcining the mixture at 850° C. for 2 hours in a low-temperature electric furnace; after grinding the calcined product to powder, passing the powder through a 40-mesh sieve to obtain calcined powder;

Step (3): sintering the calcined powder at 1,280° C. for 2 hours in a high temperature electric furnace; and Step (4): after coating the surface of the sample prepared in step (3) with silver paste, testing properties of the sample such as Curie temperature and dielectric loss.

Example 7

The preparation method of lead metaniobate piezoelectric ceramics comprises the following steps:

Step (1): weighing 41.391 g of PbO and 60.000 g of $Nb_2O_5$ and placing the materials in a ball mill tank, and then adding 137 g of deionized water; adjusting the rotation speed of the ball mill to be 360 RPM, and continuous ball-milling for 4 hours to give an evenly mixed mixture;

Step (2): drying the mixture at 120° C. until it forms a gully shape and calcining the mixture at 850° C. for 2 hours in a low-temperature electric furnace; after grinding the calcined product to powder, passing the powder through a 40-mesh sieve to obtain calcined powder;

Step (3): sintering the calcined powder at 1,280° C. for 2 hours in a high temperature electric furnace; and Step (4): after coating the surface of the sample prepared in step (3) with silver paste, testing properties of the sample such as Curie temperature and dielectric loss.

The invention claimed is:

1. A dense lead metaniobate piezoelectric ceramic, wherein the chemical composition of the lead metaniobate piezoelectric ceramic is $Pb_{1-x}Nb_2O_6$, in which x represents a Pb vacancy concentration of A sites in a tungsten bronze crystal structure, and x is greater than 0.00 and less than or equal to 0.20.

2. The lead metaniobate piezoelectric ceramic of claim 1, wherein x is greater than or equal to 0.03 and less than or equal to 0.20.

3. The lead metaniobate piezoelectric ceramic of claim 1, wherein x is greater than or equal to 0.08 and less than or equal to 0.20.

4. The lead metaniobate piezoelectric ceramic of claim 1, wherein x is greater than or equal to 0.15 and less than or equal to 0.20.

5. The lead metaniobate piezoelectric ceramic of claim 1, wherein the lead metaniobate piezoelectric ceramic has a relative density of 93% to 99%, a shrinkage ratio of 15% to 18%, and a Curie temperature of 554 to 560° C.

6. The lead metaniobate piezoelectric ceramic of claim 1, wherein the lead metaniobate piezoelectric ceramic has a Curie temperature of 554 to 560° C. and a dielectric loss tangent tan δ of 0.55% to 0.63%.

7. A preparation method of the dense lead metaniobate piezoelectric ceramic of claim 1, comprising the steps of:
weighing raw compounds corresponding to each element according to the chemical composition of $Pb_{1-x}Nb_2O_6$ and then mixing uniformly to obtain a mixture, in which x represents a Pb vacancy concentration of A sites in a tungsten bronze crystal structure, and x is greater than 0.00 and less than or equal to 0.20;
calcining the mixture at 800 to 900° C. for 1 to 3 hours to form a calcined powder; and
sintering the calcined powder at 1,260 to 1,300° C. for 2 to 4 hours to obtain the dense metaniobate piezoelectric ceramic.

8. The preparation method of claim 7, wherein the sintering is performed at a temperature of 1,260 to 1,280° C.

* * * * *